(12) United States Patent
Köck

(10) Patent No.: US 9,260,989 B2
(45) Date of Patent: Feb. 16, 2016

(54) OIL LEVEL INDICATOR FOR A SCREW-TYPE COMPRESSOR

(75) Inventor: Engelbert Köck, Planegg (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 259 days.

(21) Appl. No.: 13/641,223

(22) PCT Filed: Apr. 13, 2011

(86) PCT No.: PCT/EP2011/055766
§ 371 (c)(1),
(2), (4) Date: Nov. 30, 2012

(87) PCT Pub. No.: WO2011/128356
PCT Pub. Date: Oct. 20, 2011

(65) Prior Publication Data
US 2013/0068563 A1  Mar. 21, 2013

(30) Foreign Application Priority Data

Apr. 16, 2010 (DE) .......... 10 2010 015 150

(51) Int. Cl.
*F01M 11/12* (2006.01)
*G01F 23/292* (2006.01)

(52) U.S. Cl.
CPC ........... *F01M 11/12* (2013.01); *G01F 23/2922* (2013.01); *G01F 23/2925* (2013.01); *F25B 2700/03* (2013.01)

(58) Field of Classification Search
CPC .......... G01F 23/2925; F25B 2700/03

USPC .......... 184/7.4, 108; 73/290 R, 293
See application file for complete search history.

(56) References Cited

U.S. PATENT DOCUMENTS

| 4,306,525 A | * | 12/1981 | Faxvog ............... 123/196 S |
| 4,694,793 A | * | 9/1987 | Kawakita et al. ........ 123/196 S |
| 4,706,193 A | * | 11/1987 | Imajo et al. ............. 701/29.5 |
| 4,768,377 A | * | 9/1988 | Habelmann et al. ........ 73/313 |
| 4,840,137 A | * | 6/1989 | Beauvais et al. ............ 116/227 |

(Continued)

FOREIGN PATENT DOCUMENTS

| CA | 2225112 A1 | 6/1998 |
| DE | 4118896 A1 | 12/1992 |

(Continued)

OTHER PUBLICATIONS

Search Report for International Patent Application No. PCT/EP2011/055766; Aug. 23, 2011.

(Continued)

*Primary Examiner* — William E Dondero
*Assistant Examiner* — Minh Truong
(74) *Attorney, Agent, or Firm* — Barnes & Thornburg LLP

(57) ABSTRACT

A device for monitoring and/or indicating an oil level in an oil sump of a screw-type compressor, the oil level fluctuating in different operating states of the screw-type compressor. A device for monitoring and indicating the oil level in a screw-type compressor, the reliability thereof being improved over the prior art and erroneous measurements being excluded. The device is an optical unit which has no mechanically moving parts that can become damaged during the often rough use of the device.

8 Claims, 1 Drawing Sheet

(56) References Cited

U.S. PATENT DOCUMENTS

| | | | | |
|---|---|---|---|---|
| 5,029,471 | A * | 7/1991 | Goodrich | 73/293 |
| 5,103,648 | A * | 4/1992 | Barbier | 62/126 |
| 5,278,426 | A * | 1/1994 | Barbier | 250/577 |
| 5,282,386 | A * | 2/1994 | Niemczyk et al. | 73/292 |
| 5,399,876 | A * | 3/1995 | LaClair | 250/577 |
| 5,606,125 | A | 2/1997 | Lyons et al. | |
| 5,765,994 | A * | 6/1998 | Barbier | 417/12 |
| 5,785,100 | A * | 7/1998 | Showalter et al. | 141/198 |
| 6,161,395 | A * | 12/2000 | Okoren et al. | 62/193 |
| 6,276,901 | B1 * | 8/2001 | Farr et al. | 417/13 |
| 6,363,784 | B1 * | 4/2002 | Gregory | 73/293 |
| 6,513,368 | B2 * | 2/2003 | Bondarowicz et al. | 73/53.05 |
| 2002/0112529 | A1 * | 8/2002 | Bondarowicz et al. | 73/53.05 |
| 2003/0028296 | A1 * | 2/2003 | Miller | 701/29 |
| 2006/0069475 | A1 * | 3/2006 | Gutierrez et al. | 701/29 |
| 2006/0102429 | A1 * | 5/2006 | Suzuki et al. | 184/6.5 |
| 2007/0030133 | A1 * | 2/2007 | Campbell | 340/438 |
| 2009/0107771 | A1 * | 4/2009 | Liu et al. | 184/7.4 |
| 2010/0332089 | A1 * | 12/2010 | Gianone et al. | 701/51 |
| 2013/0068563 | A1 | 3/2013 | Koeck | |
| 2014/0172267 | A1 * | 6/2014 | Chae et al. | 701/101 |

FOREIGN PATENT DOCUMENTS

| | | |
|---|---|---|
| EP | 0460432 A2 | 12/1991 |
| EP | 0753722 A2 | 1/1997 |
| JP | 2001-516045 A | 9/2001 |
| WO | 2008122474 A1 | 10/2008 |

OTHER PUBLICATIONS

Mexican Office Action for Mexican Application No. MX/a/2012/011975 dated Jan. 26, 2015.

English translation of Japanese Office Action for Japanese Patent Application No. 2013-504252, dated Feb. 2, 2015.

* cited by examiner

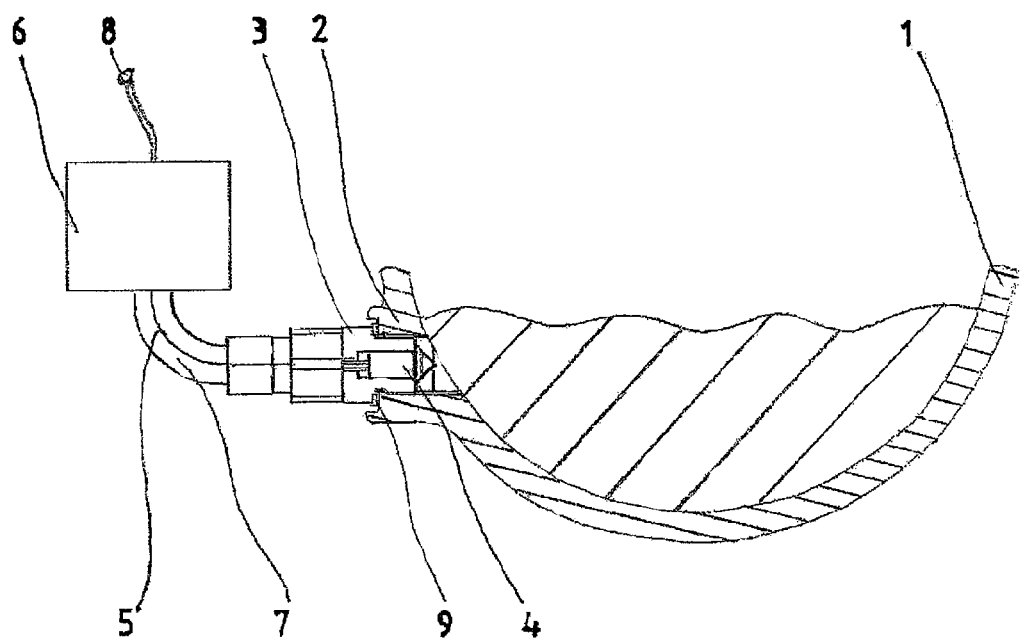

OIL LEVEL INDICATOR FOR A SCREW-TYPE COMPRESSOR

PRIORITY CLAIM

This patent application is a U.S. National Phase of International Patent Application No. PCT/EP2011/055766, filed 13 Apr. 2011, which claims priority to German Patent Application No. 10 2010 015 150.5, filed 16 Apr. 2010, the disclosures of which are incorporated herein by reference in their entirety.

FIELD

Disclosed embodiments relate to a device for monitoring and/or displaying an oil level, which fluctuates in different operating states of a screw-type compressor, in an oil sump of the screw-type compressor.

BACKGROUND

Such a device is known from DE 41 18 896 A1. The device which is described in this document is embodied as a filling level meter which generates a signal which determines the level of the oil in the reservoir container, and passes on said signal, for example, to a computer.

It is generally known that such a known filling level meter has a float which is positioned in the oil sump in accordance with the level of the oil. In this context, the float interacts, via an activation rod, with a resistance coil for setting different resistance values. These resistance values are then suitably evaluated. A problem with such mechanically acting filling level meters is their reliability, which can be adversely affected by the often delicate design of such a filling level meter. It has been repeatedly found that such filling level meters stick, the activation rod is bent or even broken and/or has penetrated the float owing to a leakage of oil and accordingly is no longer moved to the oil level, at least not in a defined position. A float leak, deformation or structural change is promoted to a great degree in applications with a very large number of pressure pulsations and high operating temperatures and wetting with oils.

SUMMARY

Disclosed embodiments provide a device for monitoring and displaying the oil level of a screw-type compressor whose reliability is improved compared to the prior art and in which incorrect measurements are excluded.

BRIEF DESCRIPTION OF THE FIGURES

Advantageous refinements of the disclosed embodiments can be found in the description of the drawing in which an exemplary embodiment of the invention which is illustrated in the single figure is described in more detail.

DETAILED DESCRIPTION

In accordance with disclosed embodiments, the device is an optical unit that does not have any mechanically moving parts which can be damaged during the often rough use of the device. In this context, in one development of the disclosed embodiments, the optical unit is an optical sensor or else even a switch which is configured without mechanically acting parts. A sensor is normally configured in such a way that continuously changing signals are generated with it, while normally two switched positions (however, if appropriate also a plurality of switched positions) are normally generated with a switch. Since the absence of mechanically moving parts rules out their failure, the reliability of the device according to disclosed embodiments is increased compared to the prior art and incorrect measurements are ruled out. This is particularly advantageous, in particular, in applications with a very large number of pressure pulsations and high operating temperatures and wetting with oils.

In a further refinement of the disclosed embodiments, the optical unit is connected to an electronic evaluation device. This evaluation device takes into account and evaluates operating states of the screw-type compressor and, in the case of a connection to an engine controller evaluates operating states of a machine or of a vehicle in which the screw-type compressor is installed. According to the operating conditions, the oil level in the oil sump can fluctuate considerably. These fluctuations which are brought about in this way can be evaluated correctly and reliably by means of the configuration according to the disclosed embodiments. On the other hand, as a result, for example, of leakage or consumption the oil level can drop, which in an extreme case can lead to a failure of the screw-type compressor given a massive deficiency of oil. Such a deficiency of oil is detected by the evaluation and eliminates the need for, for example, visual checking of the oil level, which is difficult to perform owing to installation situations which are often difficult to access.

In a further refinement of the disclosed embodiments, the evaluation device is combined with the optical unit to form a structural unit and/or is arranged separately from the optical unit. In particular, the combination of the evaluation unit with the optical unit is appropriate given the microelectronics which are available today, and provides the advantage that just a single and additionally compact component is available and has to be installed on the screw-type compressor. In addition, such a structural unit ensures that optimum adjustment of the individual components to one another is possible. Of course, it is, however, also possible within the scope of the disclosed embodiments to arrange the evaluation device separately from the sensor. In this context, within the scope of the disclosed embodiments it may also be possible to combine the evaluation device with other electrical or electronic components on the screw-type compressor and/or the vehicle or the machine. In this context, corresponding combination solutions are also conceivable.

In at least one disclosed embodiment, the optical unit is mounted in a mounting device which can be connected to the screw-type compressor. The mounting device is equipped with the optical unit and screwed into a screw-in opening which projects into the oil sump of the screw-type compressor. In this context it is possible to provide different mounting devices into which an optical unit which can be embodied in a standardized fashion is inserted. This provides the advantage that different applications can be formed with the mounting device but the optical unit is always the same.

In a further refinement of the disclosed embodiments, the mounting device can be connected to a protective hose. Such an embodiment may be provided, in particular, when the evaluation device is not combined with the optical unit and arranged or mounted at a different location, and signal lines, which transmit electrical and/or optical signals, are present.

A screw-type compressor has a pressurized container 1 in which oil collects while forming an oil sump. Such a screw-type compressor is made available, for example, in vehicles for generating compressed air which is required, inter alia, for supplying compressed air brake systems. Oil is continuously fed by such a screw-type compressor to lubricate and cool, in particular, the moving components. The oil level in the oil pan 1 can vary greatly depending on the operating conditions. The oil level during idling mode or stationary state therefore reaches a relatively high value above a minimum oil level, while during subsequent switching over to the load mode the oil level can drop to, or, which is to be avoided, below a minimum oil level as a result of the feeding by the screw-type compressor, which is then switched on. Such fluctuations are amplified by a leak or natural consumption, in particular in the direction of undershooting of a minimum oil level. Finally, for example during operation in an oblique position or during acceleration/braking (churning), the use of the machine or of the vehicle affects the oil level of the installed screw-type compressor.

The pressurized container 1 of the screw-type compressor has a screw-in opening 2 into which a mounting device 3 can be screwed. The screw-in opening 2 is arranged, for example, at the minimum level of the oil. The screw-in opening 2 and the mounting device 3 have a robust, interacting screwed connection, wherein a seal 9 is inserted between the screw-in opening 2 and the mounting device 3. The optical unit 4, in the exemplary embodiment an optical sensor, is inserted into the mounting device 3 in such a way that the optics are aligned with the oil sump. In this case, the sensor is bonded, for example, into the mounting device 3 in a suitable, sealed fashion.

The signal lines 5 which are connected to the sensor are led out of the mounting device in a suitable fashion and connected to an evaluation device 6. In the exemplary embodiment, the evaluation device 6 is arranged at a suitable location on the screw-type compressor. In order to protect the signal lines 5, a protective hose 7 which surrounds the signal lines 5 is provided, said protective hose being, in turn, connected in a suitable way to the mounting device 3 and to the housing of the evaluation device 6. For this purpose, the mounting device 3 and/or the evaluation device 6 can have a flange onto which the protective hose 7 is fitted.

The optical sensor transmits and detects light signals which are changed by the oil (or, for example, by the failure of oil to be detected in the event of damage). These signals are fed to the evaluation device 6 and evaluated.

The evaluation device 6, within the scope of the disclosed embodiments can also, for example, be integrated into the mounting device 3 by the use of corresponding microelectronics, can be connected to an engine controller of the vehicle via a line 8, and can receive signals relating to the operating state of the corresponding vehicle and evaluate said signals together with the information relating to the operating state of the screw-type compressor. The latter increases the reliability of the evaluation considerably since the oil level is, as stated above, heavily dependent on operating states.

LIST OF REFERENCE NUMBERS

1 Pressurized container
2 Screw-in opening
3 Mounting device
4 Optical unit
5 Signal line
6 Evaluation device
7 Protective hose
8 Line
9 Seal

The invention claimed is:

1. A device for monitoring and/or displaying an oil level in a screw-type compressor integrated into a vehicle, the device comprising:
   an optical unit that monitors an oil level of an oil sump of the screw-type compressor; and
   an evaluation device, connected to an engine controller of the vehicle, that evaluates signals from the optical unit indicating the oil level of the screw-type compressor, signals related to an operating state of the screw-type compressor and receives signals relating to an operating state of the vehicle from the engine controller into which the screw-type compressor is integrated, the operating state of the vehicle being one of accelerating and braking,
   wherein the oil level fluctuates in the oil sump of the screw-type compressor during different operating states of the screw-type compressor and different operating states of the vehicle, and
   wherein the evaluation device evaluates the operating state of the vehicle together with the operating state of the screw-type compressor when determining the oil level in the screw-type compressor dependent on the operating states.

2. The device of claim 1, wherein the optical unit is a sensor.

3. The device of claim 1, wherein the optical unit is a switch without mechanically acting parts.

4. The device of claim 1, wherein the evaluation device is connected to the optical unit.

5. The device of claim 4, wherein the evaluation device is combined with the optical unit to form a structural unit or is arranged separately from the optical unit.

6. The device of claim 1, wherein the optical unit is mounted in a mounting device for connection to the screw-type compressor.

7. The device of claim 6, wherein the mounting device connects to a protective hose for protecting signal lines.

8. The device of claim 6, wherein the evaluation device is integrated into the mounting device.

* * * * *